March 26, 1963

J. C. SCHINDELKA 3,082,828

STONE PICKING MACHINE

Filed Dec. 19, 1960

INVENTOR
JOHN C. SCHINDELKA
BY- Fetherstonhaugh & Co.
ATTORNEYS

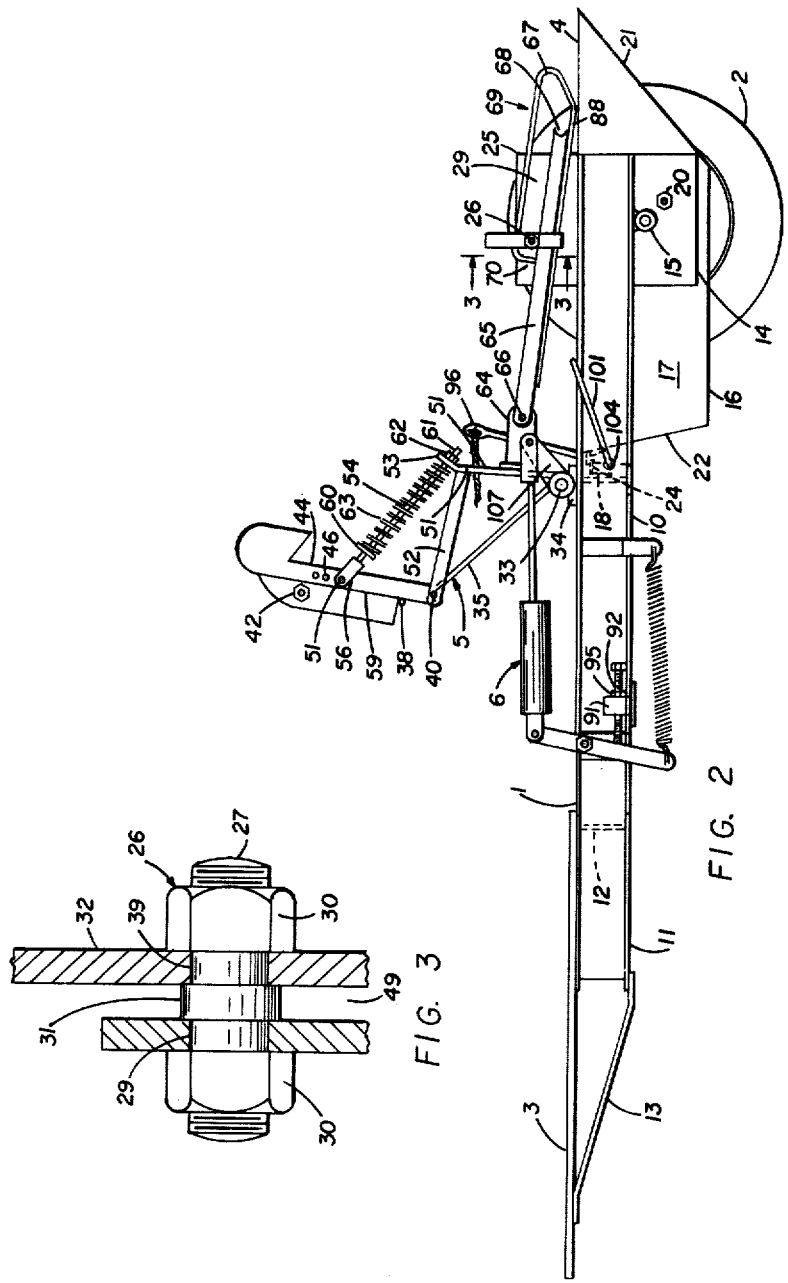

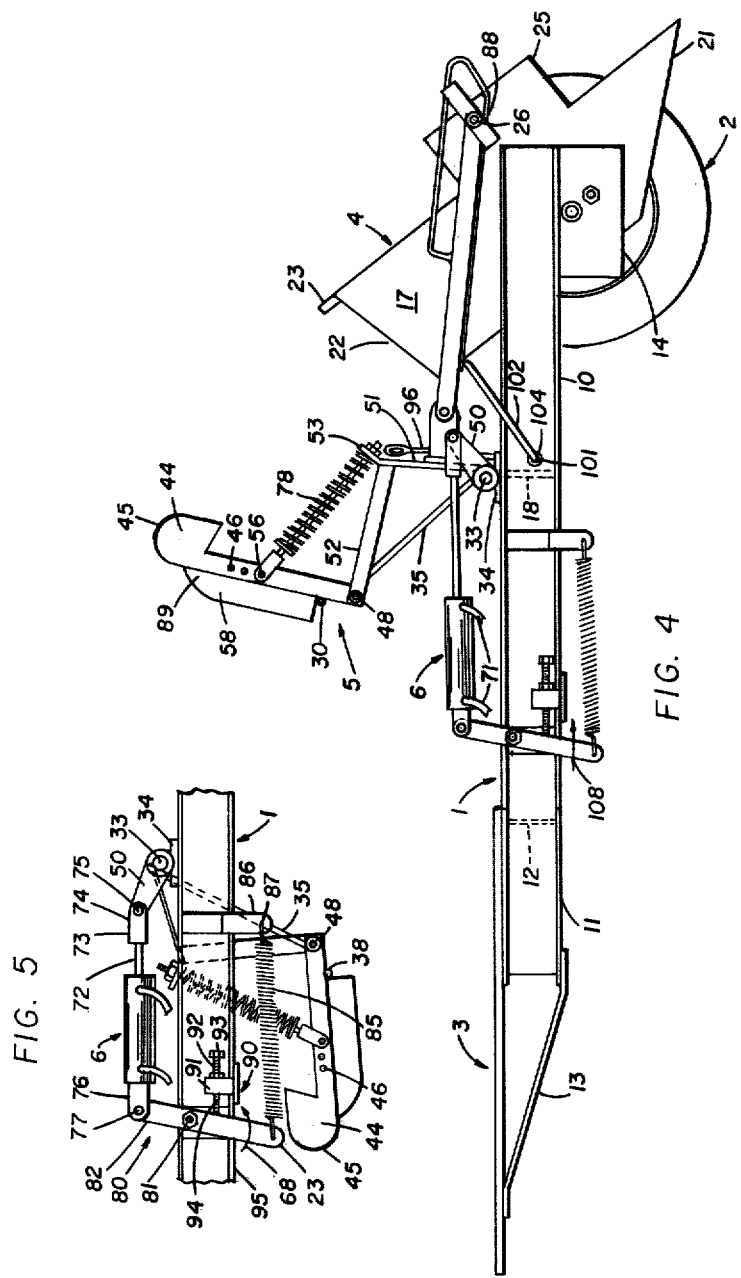

United States Patent Office 3,082,828
Patented Mar. 26, 1963

3,082,828
STONE PICKING MACHINE
John C. Schindelka, Raymore Post Office, Raymore, Saskatchewan, Canada
Filed Dec. 19, 1960, Ser. No. 76,926
1 Claim. (Cl. 171—63)

This invention relates to a machine for picking up stones or like articles, and in particular, to a machine adapted to gather articles lying on or embedded in the ground, and to dump them at a selected location.

Known types of stone pickers are often difficult to maneuver and require considerable physical exertion on the part of the operator to complete the picking up or dumping operation. Since many of the stones which are encountered by the machine are firmly embedded in the ground, considerable damage is frequently done to known type of stone picking machines or to the draft vehicle if the stone does not yield. Due to the fact that most stone pickers used today cannot be adjusted to accommodate different types of draft vehicles and soil conditions, they are occasionally used in an unefficient manner.

In the present invention, which overcomes these disadvantages, there is the provision of a machine for gathering stones having a main frame carried by ground engaging wheels, a load carrying box pivotally connected to the frame, a rake means also pivotally connected to the frame and adapted to collect stones lying on or embedded in the ground as the machine is drawn in a forward direction, a single motor adapted to selectively tilt the rake to a dumping position so as to dump collected stones into the box, or to tilt the rake and the box to a position so as to dump articles being transported in the box onto the ground.

There is also provided in the present invention, spring means which allow the rake to ride over stones firmly embedded in the ground without unduly straining some of the parts of the machine.

The present invention further comprises means to permit the adjustment of the position of the rake and of the angle of the ground engaging portion of the rake with respect to the ground.

The following is a description, by way of example, of one embodiment of the invention, reference being had to the drawings in which:

FIG. 2 is a side view of the machine with the rake tilted to the dumping position;

FIG. 3 is an enlarged sectional view taken line 3—3 of FIG. 2 showing the catch means mounted on the side of the box;

FIG. 4 is a side view similar to FIG. 2 but with the box and rake in the dumping position; and FIG. 5 is a detailed side view showing the resilient suspension of the rake and the means for adjusting the depth and angle of the ground engaging portion of the rake.

Figure 1:
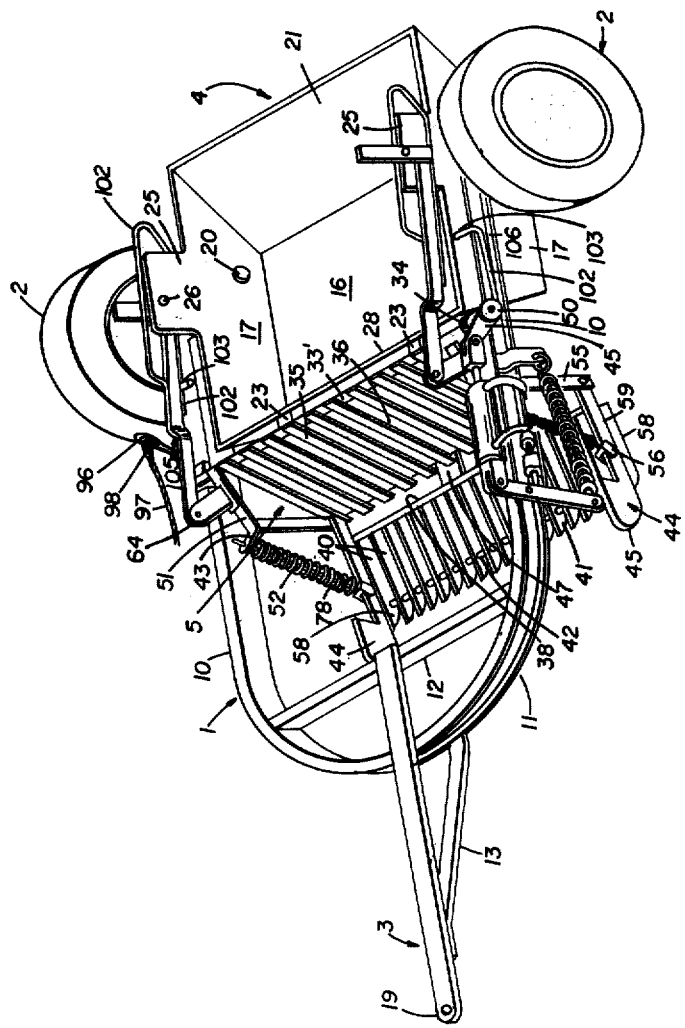
FIG. 1 is a perspective view of the stone picking machine with the stone gathering rake in the ground engaging position.

Referring more specifically to the drawings, reference character 1 denotes the main frame of a stone picking machine having ground engaging wheels 2. A hitch 3 is secured to the front of the frame to permit the machine to be attached to a draft means (not shown). An open topped, load carrying box 4 is pivotally connected to the frame 1 and is adapted to transport stones which have been gathered by a ground engaging rake 5 also pivotally connected to the frame. An hydraulic cylinder and piston motor 6 is adapted to tilt the rake 5 to a position to dump collected stones into the box. The motor 6 is preferably a well known type of double acting hydraulic motor such as that shown in Marks' Mechanical Engineers' Handbook, fifth edition, page 1755, FIGURE 2a. The motor 6 is also adapted to selectively tilt the box 4 to a position to dump the stones accumulated in the box onto the ground at a selected location.

The main frame 1, which is U-shaped, consists of two spaced parallel side portions 10 joined by a curved front portion 11. The frame is stiffened by a first transverse frame brace member 12 at the front of the machine and a second transverse brace member 18 located between the rake 5 and box 4 and fixed at its ends to the parallel side portion 10. The hitch 3 is secured to the front of the curved portion 11 of the frame and to the brace 12. A support member 13 fixed to the under side of the hitch and to the bottom of the curved portion 11 braces the hitch. A hole 19 or like means is provided at the front of the hitch to interact with a mating hitch element mounted on the rear of the draft vehicle.

Secured to the extreme rear ends of the side portions 10 of the frame are wheel and box mounting plates 14. The wheels 2 are rotatably mounted on spindles 15 carried by the plates and extending outwardly therefrom. The box 4 is pivotally connected to the plates 14 by pivot members 20 which pass through the plates 14 and the sidewalls 17 of the box.

Stop members 23 are fixed to the upper edge 28 of the front wall 22 of the box 4 and are adapted to contact the rests 24 (see FIG. 2) fixed to the transverse brace 18 to maintain the box in the load carrying position. Since the pivot points 20 are located some distance behind the centre of gravity of the volume of the box, no means other than the stop members 23 are needed to maintain the box in the load carrying position. The back wall 21 of the box slopes upwardly and rearwardly from the bottom 16 to eliminate the need of a tail gate. Both sides 17 of the box have upwardly extending projections 25 and are provided with catch means 26 near the upper edge of projection 25. The catch means 26 includes a threaded stud 27 (see FIG. 3) having an enlarged spacer portion 31 mounted in a hole 29 located near the top edge of the projection 25. The stud 27, which is secured to the projection 25 by a nut 30, extends inwardly with respect to the sidewalls 17. A guide plate 32 is held against the inside of the spacer portion 31 by a second nut 30 so that a space 49 is provided between the wall projection 25 and the guide plate 32.

A main rake bar 33 extends across the vehicle immediately in front of the box 4. It is rotatably mounted in bearing members 34 which are fixed to the side portions 10 of the main frame 1. Spaced, parallel tine members 35 are secured to the bar 33 and extend downwardly and forwardly from the bar when the rake 5 is in the ground engaging position and as shown in FIGS. 1 and 5. The lower ends of the tines are secured to a transversely extending rod 36.

A fork member 37 is pivotally connected to both ends 48 of the bar 36 by fork guides 44 and to the centre of the bar 36 by a link 47. The fork member 37 extends substantially in a forward direction from the bar 36 and includes a series of parallel, spaced tines 40 which are connected near their forward ends by a tine spacer member 42 and at their rear ends by a transversely extending fork bar 38. The lower side of tines 40 are beveled to form points 41 at the forward end of the fork. The outermost tines 58 of the fork are secured along their top portions 59 to the guides 44. The guides 44 are provided with a round protecting nose portion 45 which extend farther forward than the pointed ends 41 of the tines 40. A crank arm 50 is fixed to one end of the main rake bar 33. Spring arms 51 are also fastened to the bar 33 adjacent the ends of the bar 33 and extend in a substantially forward direction. The forward ends 43 of the arms 51 are bent slightly upward and are provided with holes 53. Braces 52 are secured to the underside of the arms 51 and are connected at their lower ends to the outer ends 48 of the bar 36. Adjustable, resilient members 78 extend between the spring arms 51 and the guides 44 to resiliently force the fork 37 into the ground engaging position. The resilient member 78 includes a rod 54 and a coil spring 63. The upper end of the rod 54, which passes through the hole 53, is threaded to receive a nut 62. The lower end of the rod 62 is bifurcated as at 55 and the space formed by the bifurcation is of sufficient width to receive the guide member 44. Holes 56 which are provided in the bifurcated end, are adapted to align with one of a series of holes 46 in the guide member 44. Thus, the lower end of the rod 54 is secured to the guide 44 by a bolt 57 or like securing means passing through the holes in the guides and the bifurcated end. A collar 60 of sufficient diameter to act as a stop for the coil spring 63 is secured to the rod 54 a short distance from the bifurcated portion 55. Therefore, the coil spring 63 which encircles the rod 54 is held in a compressed state between the arm 51 and the collar 60.

Levers 64 are fastened to the upper surface of the arms 51 and are pivotally connected at 66 to push bars 65. The push bars 65 (see particularly FIG. 2) extend toward the rear of the vehicle and are adapted to slide in the spaces 49 formed between the projection 25 of the sidewalls of the dump box 4 and the guide plates 32. The rear ends of the push bars 65 are provided with engaging concave surfaces 68 having radii substantially equal to the radius of the enlarged spacer portion 31 of the catch means 26. A curved guide rod 69 is secured at one end to the bottom of the push bar 65 and extends outwardly from the rear of the push bar to form a lower, straight guide portion 88 and a hook portion 67. The other end of the rod 69 is fastened to the top of the push bar at 70. A space 79 greater in depth than the enlarged spacer portion 31 of the catch means 26 is formed between the top of the push bar 65 and the upper, straight guide portion 74 of the rod 69.

A piston rod 72 (see particularly FIG. 5), which is fixed to a double acting piston (not shown) in the cylinder 73 of the motor 6, is pivotally connected at 75 to the crank arm 50. Flexible hoses 71 supply pressurized fluid to either side of the double acting piston from a pump and control means (not shown) carried by the draft vehicle. Many modern farm tractors are provided with an hydraulic system, which system includes a pump and control means such as the pump and control means shown in Marks' Engineers' Handbook, fifth edition, page 1756, FIGURE 3. Thus the motor expands or contracts in the ordinary way as the pressurized fluid is supplied alternatively to one or the other of the hoses 71. Member 76 which is secured to the closed end of the cylinder 73 is pivotally connected at 77 to one end 82 of a link 80. The link 80 is connected at its other end 83 to one end 84 of a coil spring 85 and pivotally connected intermediate its ends 82 and 83 to the frame by a pivot post 81. The opposite end 87 of the spring 85 is connected to an anchor element 86 which is fastened to the frame.

An adjustable depth control member 90 which is secured to the frame has a threaded body portion 91. A threaded bolt 92 having a square or hexagonal head 93 and an end 94 adapted to engage link 80 is screwed into the body 91. A stop nut 95 carried by the bolt 92 engages body 91 to lock the bolt 92 in a particular setting.

A control lever 96 is fixed to a cross bar 101 that extends across the full width of the machine and is free to rotate in holes 104 in the side portions 10 of the frame. Two trip bars having inwardly projecting ends 113 are provided, one fastened to each end of the cross bar 101, to engage and raise the push bar 65 when the lever 96 and bar 101 are rotated in the directions of the arrows 105 and 106, respectively, as shown in FIG. 1. A flexible rope or chain 97 is connected to the lever 96 and extends to the draft vehicle so that it may be pulled by the operator of the vehicle.

In operation, several adjustments can be made to the machine to accommodate different types of draft vehicles and soil conditions. The spring 85 is constantly under pressure which tends to swing link 80 in the direction of arrow 108 (see FIG. 5). The resulting force is transmitted through the hydraulic unit 6, which acts as a solid link in its inoperative position, to the crank arm 50. Thus, the whole rake is biased towards the ground about the main rake bar 33. The position of the rake with respect to the ground is governed by the control means 90 since the rotation of the link 80 in the direction of the arrow 108 is stopped when the link 80 contacts the end 94 of the bolt 92. Therefore, when the stop nut 95 is loosened and the bolt 92 turned, the end 94 of the bolt 92 allows the link to swing further in the direction of the arrow 108 to lower the rake, or it swings the link in a direction opposite to that of the arrow 108 to raise the rake. Also, the angle between the fork 37 and the tines 35, and the force tending to bias the forward ends of the fork into the ground can be adjusted. For example, if the bolt 57 is removed from the bifurcated end 55 of the rod 54, it is necessary to raise the forward end of the fork 37 before the bolt can be inserted into the aligned holes in the bifurcated portion 55 of the rod and a hole nearer the front of the series of holes 46. By adjusting the nut 62 on the threaded end 61 of the rod 54, the rod can be drawn up or extended to again raise or lower the forward end of the fork. The adjustment of nut 65 also varies the compression of the springs 53, which, of course, varies the force tending to hold the forward end of the fork down into the ground.

As a draft vehicle (not shown) draws the machine by the hitch 3 in the forward direction across a field, the pointed ends 41 of the tines 40 travel slightly below the surface of the soil. The stones are scooped up by the tines and pushed by the forward motion of the machine towards and collected near the back of the rake and the soil is allowed to flow freely through the spaces between the tines. However, if the tines 40 encounter a large stone, which is firmly embedded in the ground, the bevelled ends 41 ride up onto the stone raising the entire front end of the fork 37 against the force provided by resilient members 78. As the fork passes over the stone and the back of the rake approaches it, the entire rake 5 rises smoothly against the force exerted by spring 85 through link 80, hydraulic unit 6, crank arm 50 and the main rake bar 33. As soon as the rake has passed over the embedded stone it is forced by springs 63 and 85 back to its normal operating position. When several stones have accumulated in the rake, the operator of the draft vehicle manipulates a control member (not shown) to supply pressurized fluid to the motor 6, by way of one of the flexible hoses 71, to expand the motor 6 as shown in FIG. 2. This forces the arm 50 to rotate in the direction of the arrow 107. The rotation of the arm 50 in this direction causes the main rake bars to also rotate in this direction, and, thus, to swing the rake to a dumping position as shown in FIG. 2. The accumulated stones slide down tines 35 and are deposited in the box 4. As the rake swings to the dumping position the push bar 65 is forced towards the rear of the machine. However, the guide portions 74 of the rod 69 which are in engagement with the spacer portion 31 of the catch means 26 slides over the spacer portion 31 and the concave end 68 of the push bar 65 passes below the catch means 26 to the position shown in FIG. 2. When the dumping of the rake is completed, the control member is again manipulated to supply pressurized fluid through the other flexible hose 71 causing the motor to contract. The contraction of the motor 6 returns the rake and the push bar to the normal position as shown in FIG. 1.

When the dump box 4 becomes full, all of the stones in it can be dumped at a selected location by causing the box 4 to tilt from a position in which the stop members 23 bear against the rest members 24 to the dumping position as seen in FIGURE 4. The tilting action of the box 4 is brought about when the operator pulls the rope 95 before the controls are operated to cause the motor 6 to expand. This causes the trip bars to swing in the direction of the arrow 106 (see FIG. 1) and to engage and lift the push bars 102 until the bottom guide portion 88 of the rod 69 engaged the enlarged spacer portion 31 of the catch means 26. Thus, as the push bar 65 moves towards the rear of the machine as the motor expands, the concave surface 68 of the rear end of the push bar 65 engages the enlarged spacer portion 31 and the box 4 is pushed to the tilting position about pivots 20 as shown in FIG. 4. After all of the stones in the box 4 have been dumped into the ground, contraction of the motor 6 is brought about causing the push bar 65 to be drawn toward the front of the machine. As the push bar 65 is drawn in this direction the hook portion 67 of the rod 69 engages the spacer portion 31 of the catch means and pulls the box back to the normal position shown in FIGS. 1 and 2. When the box 4 has been returned to the normal position, the machine is again ready to repeat the gathering operation as set out above.

What I claim as my invention is:

A stone gathering machine comprising a frame member having a front portion and two parallel rearwardly extending side portions, a hitch means secured to the front portion, wheel mounting means secured to the outside of said side portions, a load carrying open topped box having a rearwardly sloped back wall, said box being pivotally connected between said side portions, and being adapted to tilt about a transverse axis from a load carrying position to a dumping position, catch means mounted on the sides of said box, a stone gathering rake mounted in front of said box and between said side portions and adapted to tilt to a position to drop collected stones into said box, said rake including a main rake bar pivotally connecting said rake to said frame, a first set of substantially downwardly projecting tines connected to said bar, a second set of substantially forwardly projecting tines pivotally connected to the lower ends of said first set of tines, the downward travel of the forward ends of said second set of tines being limited in relation to said first set by adjustable limiting means, the upward travel of the forward ends of said second set of tines in relation to said first set being resisted by spring means; an hydraulic cylinder and piston unit, the outer end of the piston rod being connected to a crank arm secured to the end of said rake bar, a push bar connected to said rake bar and adapted to move towards the rear of the machine when said rake is caused to move to the dumping position by the action of the piston rod on the crank arm, control means being provided to selectively move said push bar to a position to engage said catch means and dump the box during the rearward movement of the push bar, a link being pivotally connected to one end to said cylinder, said link being pivotally connected intermediate its length to the frame, spring means being connected to the other end of said link and to the frame, the rake being biased to a stone gathering position by said spring transmitting through said link and hydraulic units, and adjustable means connected to the frame and acting on said link to limit the downward movement of the rake.

References Cited in the file of this patent

UNITED STATES PATENTS

| | | |
|---|---|---|
| 2,738,633 | Bestland et al. | Mar. 20, 1956 |
| 2,806,541 | Hanley | Sept. 17, 1957 |
| 2,980,189 | Jacobs | Apr. 18, 1961 |

UNITED STATES PATENT OFFICE
CERTIFICATE OF CORRECTION

Patent No. 3,082,828                                  March 26, 1963

John C. Schindelka

It is hereby certified that error appears in the above numbered patent requiring correction and that the said Letters Patent should read as corrected below.

In the heading to the printed specification, after line 5, insert -- Claims priority, application Canada Dec. 13, 1960 --.

Signed and sealed this 14th day of January 1964.

(SEAL)
Attest:

ERNEST W. SWIDER
Attesting Officer

EDWIN L. REYNOLDS

Acting Commissioner of Patents